US009411847B2

(12) United States Patent
Margalit et al.

(10) Patent No.: US 9,411,847 B2
(45) Date of Patent: Aug. 9, 2016

(54) TRACKING CHANGES THAT AFFECT PERFORMANCE OF DEPLOYED APPLICATIONS

(71) Applicant: VMware, Inc., Palo Alto, CA (US)

(72) Inventors: Adar Margalit, Modiin (IL); Eran Dvir, Tel Aviv (IL)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 14/612,986

(22) Filed: Feb. 3, 2015

(65) Prior Publication Data

US 2015/0149424 A1    May 28, 2015

Related U.S. Application Data

(63) Continuation of application No. 13/491,305, filed on Jun. 7, 2012, now Pat. No. 8,954,387.

(51) Int. Cl.
G06F 17/00     (2006.01)
G06F 17/30     (2006.01)
G06F 11/34     (2006.01)
G06F 11/30     (2006.01)

(52) U.S. Cl.
CPC ...... *G06F 17/30371* (2013.01); *G06F 11/3051* (2013.01); *G06F 11/3476* (2013.01); *G06F 17/30368* (2013.01); *G06F 11/3003* (2013.01); *G06F 2201/835* (2013.01); *G06F 2201/86* (2013.01); *G06F 2201/865* (2013.01)

(58) Field of Classification Search
CPC ..... G06F 17/50; G06F 9/4443; G06F 17/248; G06F 3/0481; G06F 3/0482; G06F 3/04842
See application file for complete search history.

(56) References Cited

U.S. PATENT DOCUMENTS

| 7,774,657 | B1 | 8/2010 | Hardman |
| 2002/0161860 | A1 | 10/2002 | Godlin et al. |
| 2006/0136510 | A1* | 6/2006 | Voronov ............ G06F 17/24 |
| 2008/0294777 | A1 | 11/2008 | Karve et al. |
| 2010/0218031 | A1 | 8/2010 | Agarwal et al. |
| 2013/0232124 | A1 | 9/2013 | Gaither |

OTHER PUBLICATIONS

Yi-min Wang, Microsoft Corporation, "What has changed on my Machine Lately", Jan. 5, 2004.
Office Action dated Dec. 18, 2015 for U.S. Appl. No. 13/491,329.

* cited by examiner

*Primary Examiner* — Truong Vo (57) ABSTRACT

An application monitoring infrastructure that enables application configuration changes on multiple machines across multiple OS types to be tracked by identifying data containers that are to be monitored for changes, detecting a change to a monitored data container, and storing data representative of a changed version of the monitored data container responsive to detecting that the monitored container was changed. The data containers that are to be monitored for changes are identified from templates, and a unique template is provisioned for each of the applications.

20 Claims, 6 Drawing Sheets

TRACKING CHANGES THAT AFFECT PERFORMANCE OF DEPLOYED APPLICATIONS

CROSS-REFERENCE TO RELATED APPLICATION(S)

This application is a continuation of U.S. patent application Ser. No. 13/491,305, entitled "Tracking Changes That Affect Performance of Deployed Applications," filed Jun. 7, 2012, which is related to U.S. patent application Ser. No. 13/491,329, entitled "Correlating Performance Degradation of Applications to Specific Changes Made to Applications," filed Jun. 7, 2012.

BACKGROUND

With the transition to virtualized infrastructure in recent years, outages due to configuration changes to applications have been on the rise. Some of the more common configuration changes include code push, and changes to the clustering configuration, number of threads allocated to applications, and datastore configuration. Although many of these changes are tested prior to rolling them out in the production environment, outages and significant performance degradations are not discovered, indeed cannot be discovered, if they result from scale issues, e.g., when the changes are rolled out in a cloud environment having virtual machines that number in the millions.

SUMMARY

One or more embodiments disclosed herein provide an application monitoring infrastructure that enables application configuration changes on multiple machines across multiple OS types to be tracked, and correlated to performance degradation and outages.

A method for tracking configuration changes of applications, according to an embodiment, includes the steps of identifying data containers that are to be monitored for changes, detecting a change to a monitored data container, and storing data representative of a changed version of the monitored data container responsive to detecting that the monitored container was changed, wherein the data containers that are to be monitored for changes are identified from templates, and a unique template is provisioned for each of the applications.

A method for tracking configuration changes of applications, according to another embodiment, includes the steps of identifying data containers that are to be monitored for changes, receiving notifications of file events, transforming multiple file events into a normalized file event, detecting a change to a monitored data container based on the normalized file event, and storing data representative of a changed version of the monitored data container responsive to detecting that the monitored container was changed.

Further embodiments of the present invention include, without limitation, a non-transitory computer-readable storage medium that includes instructions that enable a computer system to implement one or more aspects of the above methods as well as a computer system configured to implement one or more aspects of the above methods.

DETAILED DESCRIPTION

Figure 1:
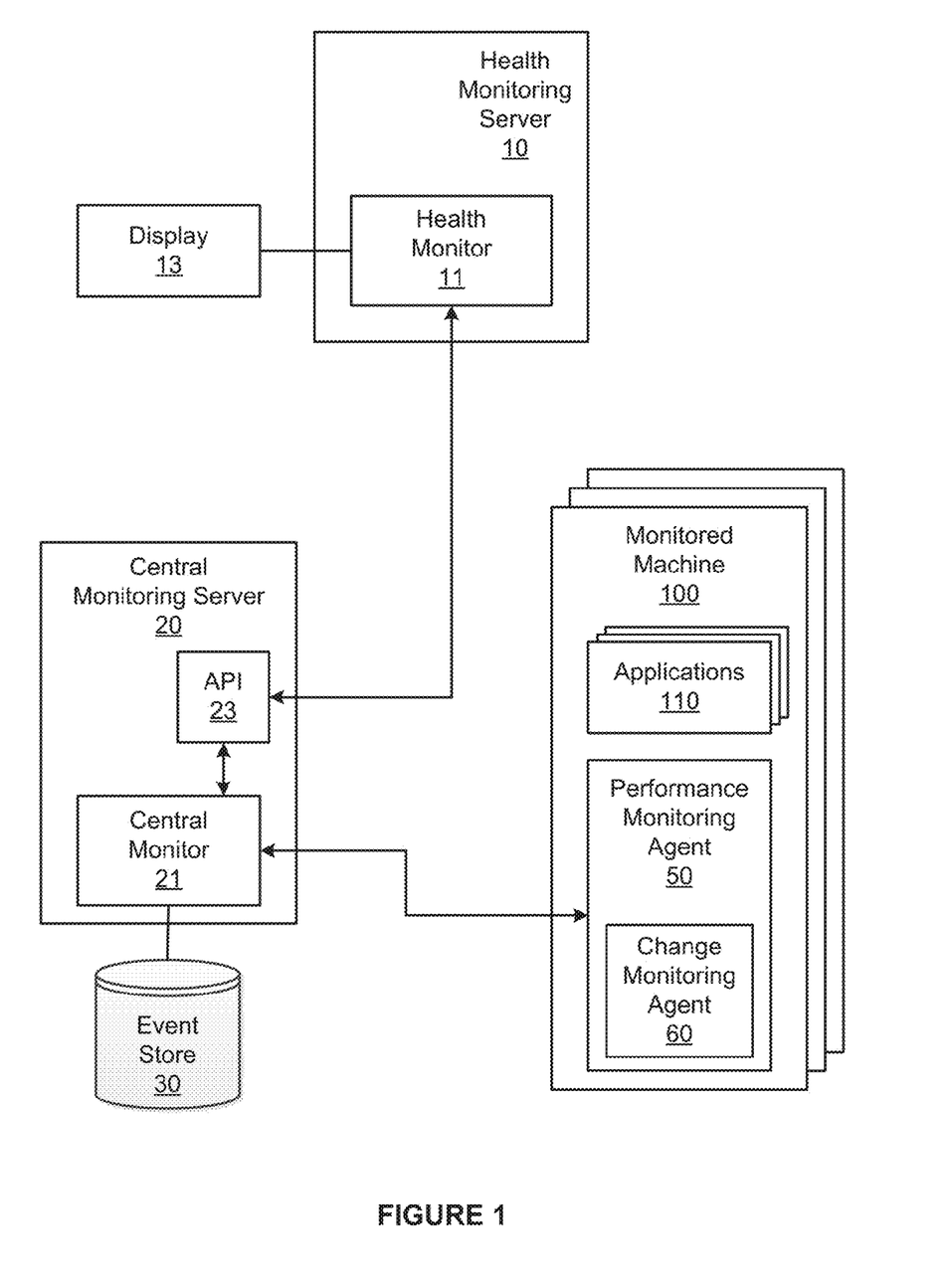
FIG. 1 is a simplified diagram of a computing environment in which one or more embodiments may be practiced.

FIG. 1 is a simplified diagram of a computing environment in which one or more embodiments may be practiced. In one embodiment, the computing environment is a cloud computing environment that includes a plurality of physical computing devices ("physical machines") networked together and managed by an entity such as a cloud controller. The diagram of FIG. 1 illustrates components of the computing environment that monitor the performance of various applications and physical machines deployed therein. The monitoring components include a health monitoring server 10 and a central monitoring server 20, one or both of which may be implemented in a physical machine, in a virtual machine, or as software as a service. Central monitoring server 20 collects performance and change data from a plurality of monitored machines 100, and health monitoring server 10 accesses such data and displays them to a system administrator, e.g., through a graphical user interface (GUI). An example of health monitoring server 10 is VMware vFabric Appinsight, which is commercially available from VMware, Inc. of Palo Alto, Calif. An example of central monitoring server 20 is VMware vFabric Hyperic, which is also commercially available from VMware, Inc. It should be recognized that, in alternative embodiments, the functions of health monitoring server 10 and central monitoring server 20 described herein may be carried out by a single server.

Each of health monitoring server 10, central monitoring server 20, and monitored machines 100 includes hardware components of a conventional computing device, such as processor and system memory, and system level software. Health monitoring server 10 further includes software components running on top of its system level software, one of which is shown in FIG. 1 as health monitor 11. Health monitor 11 communicates with central monitoring server 20 over a network to retrieve application performance data and change data from central monitoring server 20 through an application programming interface (API) 23. Health monitor 11 also processes the retrieved performance data and change data to generate various GUIs that are presented to the system administrator through a display 13.

Central monitoring server 20 further includes software components running on top of its system software, which are shown in FIG. 1 as central monitor 21 and API 23. Central monitor 21 communicates with monitored machines 100 to collect application performance and change data from them, and store them in an event store 30. Central monitor 21 makes such collected data available to health monitor 11 through API 23.

Each of monitored machines 100 includes one or more applications 110 running on top of its system software. It also includes a performance monitoring agent 50 that monitors the performance and/or behavior of applications 110, such as central processing unit (CPU) usage, physical memory usage, and latency, and a change monitoring agent 60 that monitors changes to various files and folders designated by the system administrator as being monitoring targets. Some examples of applications that can be tracked include web server applications such as Tomcat, JBoss, Websphere, Weblogic, and IIS, and database applications such as MySQL, PostgreSQL, Oracle, and MSSQL. Monitored machines 100 may be physical or virtual machines. Physical machines include any computing device, such as server-grade computing platforms, desktop and laptop computing devices, and mobile computing devices, such as tablet computers and smart phones.

Figure 2:
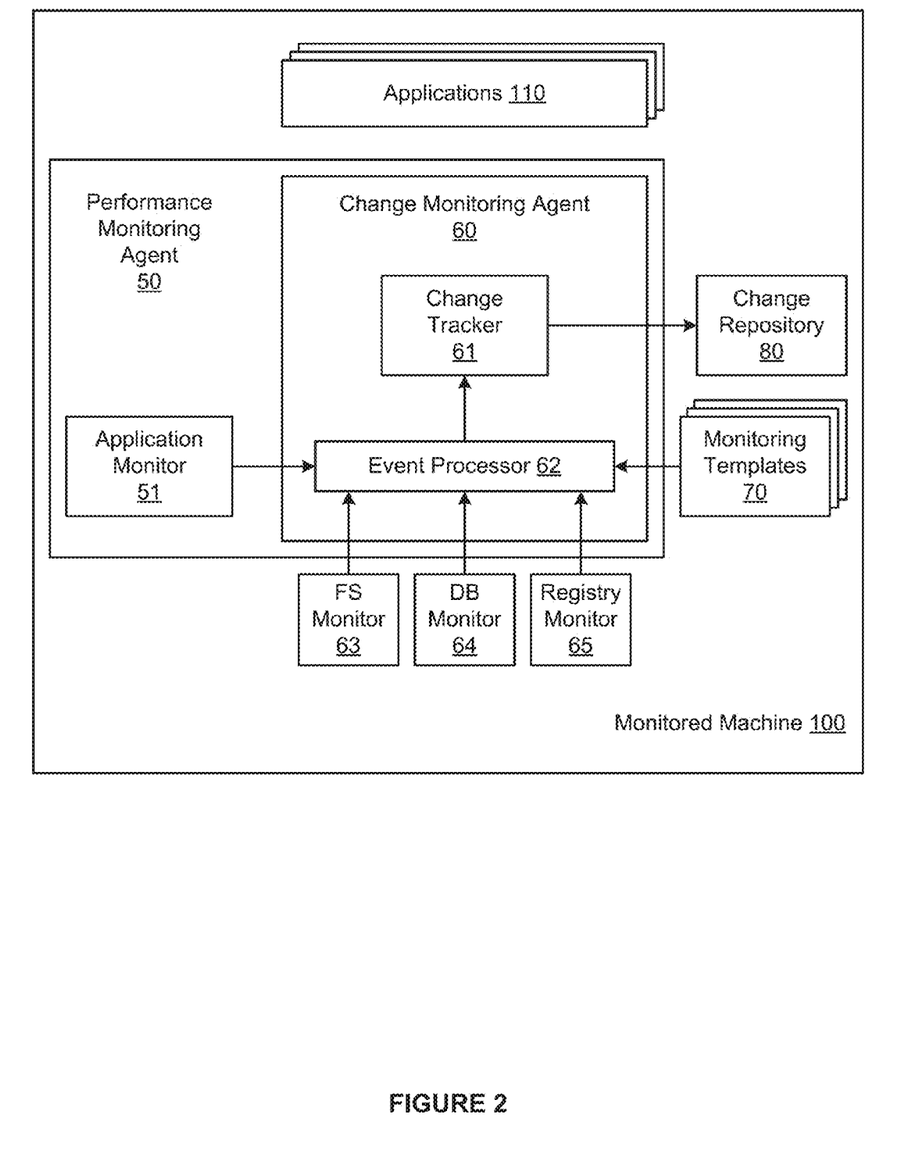
FIG. 2 is a conceptual diagram that illustrates various software components of a monitored machine that enable tracking of changes made to applications running in the monitored machine.

FIG. 2 is a conceptual diagram that illustrates various software components of a monitored machine that enable tracking of changes made to applications 110 running in the monitored machine. The presence of applications 110 running in monitored machine 100 is discovered through application monitor 51, which keeps track of installed applications. Applications 110 running in monitored machine 100 may be designated for performance monitoring and change tracking according to embodiments described herein, and each application that is designated for such monitoring and change tracking has a monitoring template 70 associated therewith. Monitoring templates 70 are stored and maintained in a persistent storage device of monitored machine 100, and for efficient access, may be cached in system memory of monitored machine 100. A sample monitoring template is illustrated in TABLE 1.

TABLE 1

```
<plugin package="org.hyperic.hq.plugin.tomcat" name="tomcat"
version="@project.version@">
<metrics name="Some_metrics">
</metrics>
<server name="Apache Tomcat" version="5.5"
platforms="Unix,Win32">
    <property name="VERSION_FILE" value="server/lib/catalina-
    storeconfig.jar"/>
    <plugin type="config_track"
    class="org.hyperic.hq.product.FileChangeTrackPlugin">
      <monitored>
        <folder path="conf" recursive="true"
        filter=".*.properties|.*.xml|.*.policy"/>
        <folder path="bin" recursive="false" filter=".*.bat|.*.xml|.*.sh"/>
        <folder path="lib" recursive="false" filter=".*.jar"/>
        <folder path="webapps" recursive="true"
        filter=".*.jar|.*.dll|.*.class|.*.jsp|.*.php|.*.pl|.-
        *.js|.*.py|.*.pyc|.*.cgi"/>
        <folder path="data" recursive="false" filter=".*.conf"/>
        <!-- system variable PGDATA -->
        <folder path="%PGDATA%" recursive="false" filter=".*.conf"/>
      </monitored>
    </plugin>
</server>
</plugin>
```

Monitoring template 70 for an application identifies the application being monitored, and paths of folders and files to be monitored, some recursively, for that application. In the example given in TABLE 1, the application being monitored is "Apache Tomcat" and the folders and files that are to be monitored recursively have a recursive flag set to be true. Within a monitored folder, a regular expression filter is used to determine which files are monitored. In addition, monitoring template 70 may designate folders and files to be monitored using environmental or system variables so that files that affect the performance of the application and whose location on the file system is determined by environment/system variables may be monitored and tracked according to embodiments described herein. Using monitoring template 70, the folders and files for any application being monitored may be custom defined. By using monitoring template 70, the number of folders and files to be monitored can be reduced to a manageable (practical) number.

Change monitoring agent 60 monitors changes to various files and folders of particular applications 110 being monitored as specified in monitoring templates 70. As shown, change monitoring agent 60 includes two modules. The first is an event processor 62 that receives notifications from the system software of monitored machine 100 that a certain folder or file has been changed. The particular components of system software that are providing the notifications are a file system (FS) monitor 63, a database (DB) monitor 64, and for Microsoft Windows® systems, a registry monitor 65. In one embodiment, a Java® library known as "jpathwatch" is used to monitor file system changes such as file creation and deletion, file modification, file renaming, and changes in subfolders. As will be further described below in conjunction with FIG. 3, event processor 62 evaluates the changes detected by FS monitor 63, DB monitor 64, and registry monitor 65 and produces change events for further processing by change tracker 61, which is the second module within change monitoring agent 60 shown in FIG. 2. Change tracker 61 receives change events from event processor 62 and processes the versioning of the changes to files using a versioning tool to store any changes to the files in change repository 80, which may be provisioned in system memory or local storage. In one embodiment, the versioning tool known as Git is used.

Figure 3:
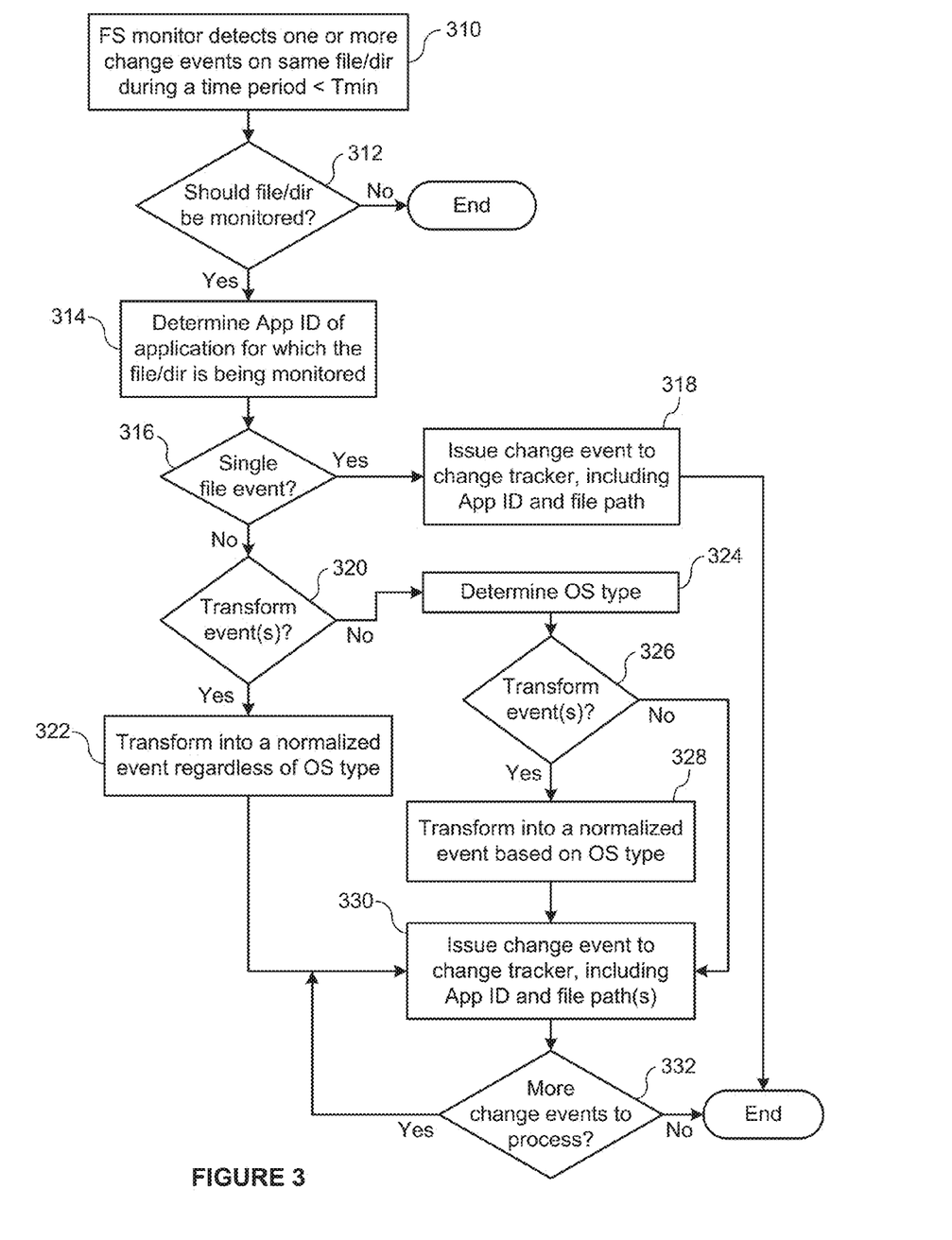
FIG. 3 is a flow diagram of a method for generating change events when a change to a folder or a file is detected.

FIG. 3 is a flow diagram of a method for generating change events when a change to a folder or file is detected. In the embodiment described herein, this method is carried out by change monitoring agent 60, in particular, event processor 62.

The method begins at step 310 when FS monitor 63 detects one or more change events on the same file or folder during a configurable time period, Tmin. In some situations, multiple change events relating to effectively the same change are triggered, and this time period is set so that such change events can be captured and analyzed collectively. In one embodiment, this time period is set as 2 milliseconds. At step 312, event processor 62 determines whether or not the file or folder should be monitored, based on the installed applications that it discovered through application monitor 51 and the monitoring templates 70. For each monitored folder, event processor 62 registers with the underlying system software for change event notifications. If the file or folder for which the change event is detected at step 310 is not specified in a monitoring template's filter of an installed application, the method ends. On the other hand, if the file or folder for which the change event is detected at step 310 is specified in a monitoring template of an installed application, step 314 is executed where event processor 62 determines the application ID (App ID) of the installed application for which the file or folder is being monitored. Then, at step 316, event processor 62 determines whether a single file event is being processed. If a single event is being processed, step 318 is executed, where event processor 62 issues a change event, including the App ID and the path to the changed file to change tracker 61. If, on the other hand, a folder event or multiple file events are being processed, step 320 is executed.

At step 320, event processor 62 determines whether it can transform a folder event or multiple file events into a single, normalized event, without relying on any OS-specific knowledge. For example, if two or more modify events are triggered for the same file within the time period, Tmin, event processor 62 may interpret all such modify events as a single modify event. In such situations, event processor 62, at step 322, transforms the multiple events into a single, normalized event. Thereafter, step 330 is executed, where event processor 62 issues a change event, including the App ID and the path(s) to any changed files to change tracker 61. The method ends after step 330 as there are no more change events to process.

If, at step 320, event processor 62 determines that it cannot transform a folder event or multiple events into a single, normalized event, without relying on any OS-specific knowledge, steps 324 and 326 are executed. At step 324, event processor 62 determines the OS-type and, at step 326, event processor 62 determines whether it can transform the folder event or multiple events into a single, normalized event, with reliance on OS-specific knowledge. For example, in Windows® OS, a file creation triggers five separate events—create, delete, recreate, modify, and modify. Event processor 62, at step 328, transforms all such events into a single, normalized file creation event and, at step 330, issues a change event, including the App ID and the path to the newly created file, to change tracker 61. Another example is a folder copy event in Windows® OS, which triggers a folder create event and multiple file events for each file in the folder. Event processor 62, at step 328, transforms the folder copy event and the subsequent file events into a single, normalized folder event and, at step 330, issues a change event, including the App ID and the paths to the files in the folder, to change tracker 61. With Linux® OS, where a folder copy event triggers only a single folder event, event processor 62, at step 328, transforms the folder copy event into a single, normalized folder event and, at step 330, issues a change event, including the App ID and the paths to the files in the folder, to change tracker 61. In all three examples given above, the method ends after step 330 as there are no more change events to process.

In some situations where normalization may not be desired or cannot be implemented, each change event is processed as a separate change event at step 330. The method ends when it is determined at step 332 that all change events have been processed.

Figure 4:
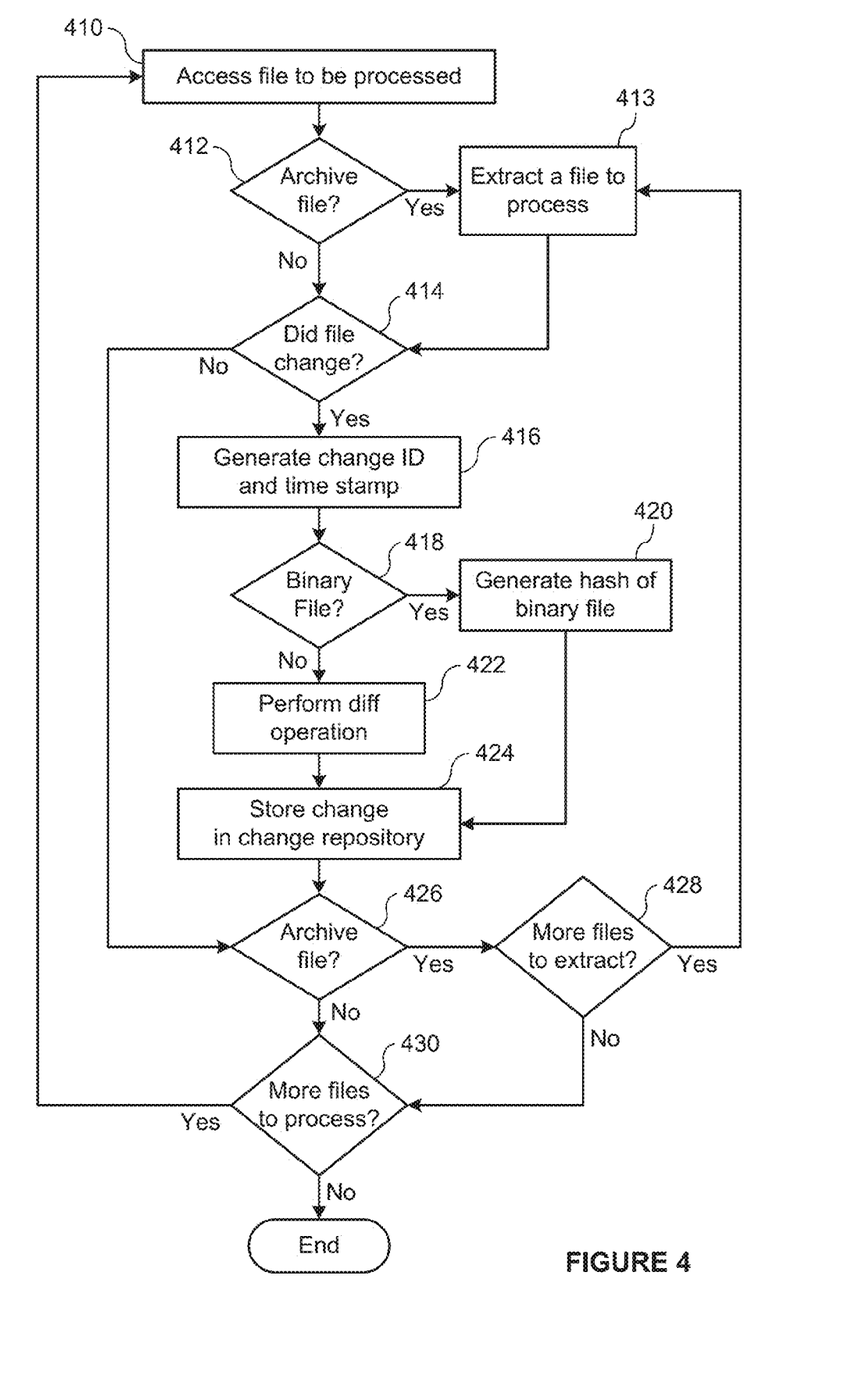
FIG. 4 is a flow diagram of a method for versioning changes made to files of monitored applications.

FIG. 4 is a flow diagram of a method for versioning changes made to files of monitored applications. In the embodiment illustrated herein, change tracker 61 is performing the steps of this method and change tracker 61 is employing a versioning tool known as Git for steps 414 through 424 of this method.

When change tracker 61 pulls a change event with a file path and a change type (create, delete or modify) from a queue of change events maintained by event processor 62, change tracker 61 accesses the files at the indicated file path. This method begins at step 410 with the accessing of one such file. In some situations, the accessed file may be an archive file such as a JAR file or a WAR file, and change tracker 61 checks for this at step 412. If the accessed file is an archive file, change tracker extracts a file to process from the archive file at step 413, and step 414 is executed thereafter. If not, the method proceeds directly to step 414 and the accessed file is processed.

At step 414, the processed file is checked for changes. If there are no changes, the file is not versioned and the method jumps to step 426. If there are changes, a change ID and a time stamp for the changes is generated at step 416. If the changed file is binary file, as determined at step 418, a hash of the binary file is generated (step 420) and stored in change repository 80 along with the change ID and the time stamp (step 424). If, on the other hand, the changed file is a text file, a diff operation is performed on the text file against the prior version of the text file to generate a diff file (step 422) and the diff file is stored in change repository 80 along with the change ID and the time stamp (step 424).

If the file being processed is an archive file, as determined at step 426, step 428 is executed to see if there is any more file to be extracted from the archive file. If there is any more file to be extracted from the archive file, the method returns to step 413 where another file is extracted. If there are no more files to be extracted from the archive file or the file being processed is not an archive file, change tracker 61 executes step 430 to see if there are any more files to process. The method ends if there are no more files to process, and returns to step 410 if there is at least one more file to process.

As previously described, central monitor 21 of central monitoring server 20 communicates with monitored machines 100 to collect performance and change data from them, and store them in event store 30. The frequency of the collection is configurable. The performance data that are collected include App ID and time history of the CPU usage, memory usage, and latency. The change data that are collected and stored in event store 30 include the change ID, App ID, time stamp, path of changed file, and the diff file.

Figure 5:
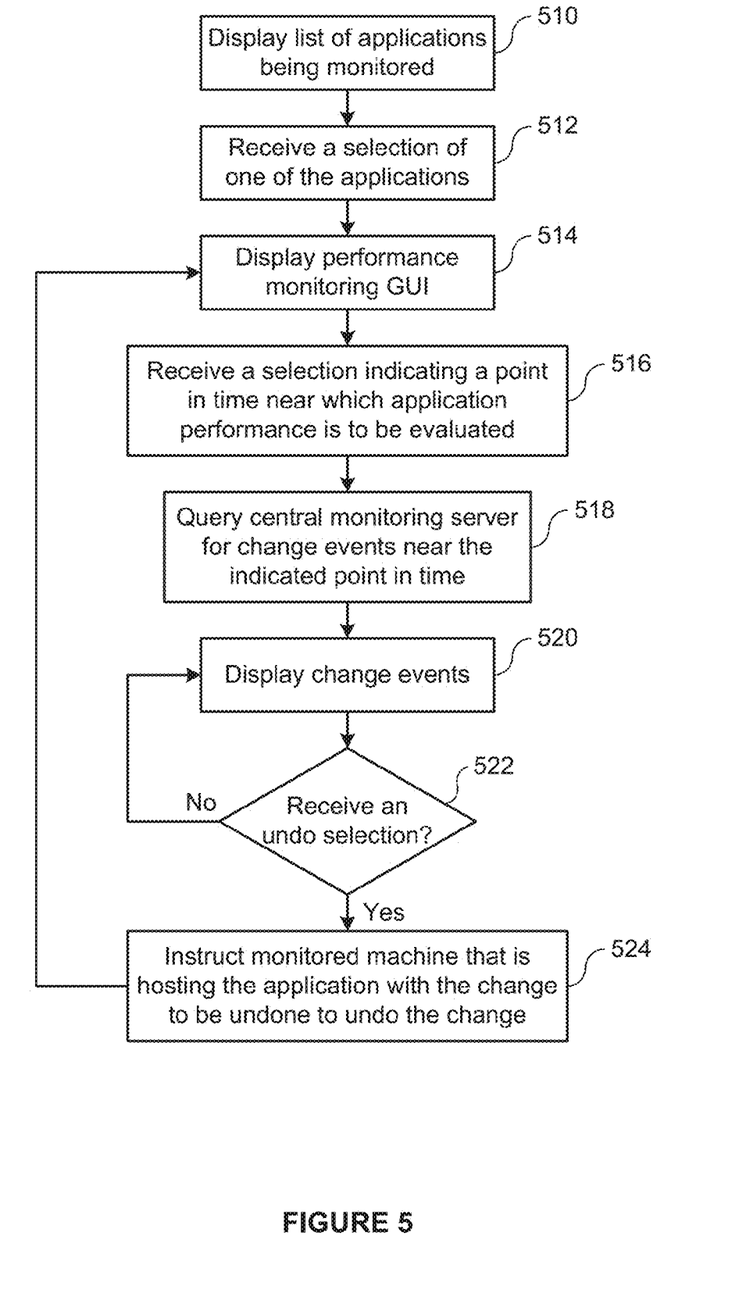
FIG. 5 is a flow diagram of a method for generating, and processing inputs made to, an application performance monitoring user interface.

Health monitor 11 of health monitoring server 10 accesses the performance data and the change data through API 23 to carry out a method for generating, and processing inputs made to, an application performance monitoring UI. The steps of this method are illustrated in FIG. 5.

Figure 6A:
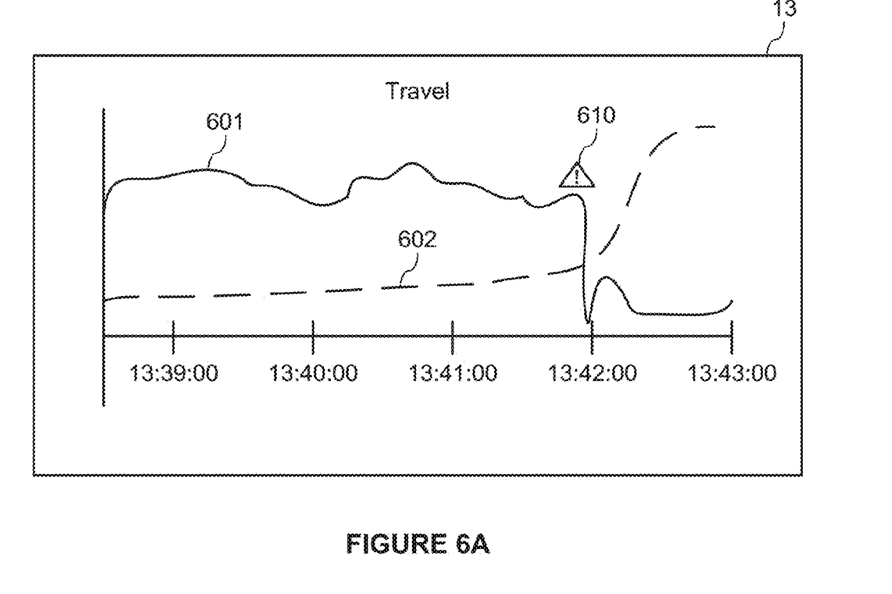
FIG. 6A illustrates a sample application performance monitoring user interface.
Figure 6B:
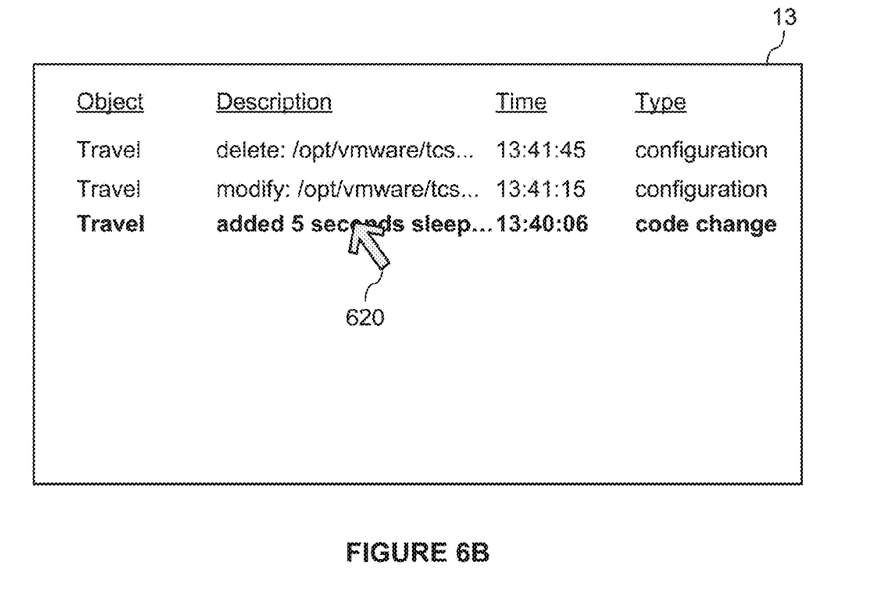
FIG. 6B illustrates a sample application change tracking user interface.

At step 510, health monitor 11 displays a list of applications being monitored on a UI. A system administrator viewing the UI may select an application of interest, e.g., travel web server. Upon receiving this selection at step 512, health monitor displays a performance monitoring UI for the selected application at step 514. A sample performance monitoring UI is illustrated in FIG. 6A, and shows a time history of CPU usage 601 and latency 602. A user-selectable warning symbol 610 is displayed at a particular point in time of the illustrated time histories as an indicator of when performance degradation of the selected application has occurred. When the system administrator makes an input selection (e.g., a mouse click or a tap on a touch screen) on warning symbol 610 and health monitor 11 receives this selection at step 516, health monitor 11 queries central monitoring server 20 for change events that are close in time to the performance degradation. In response to the query, central monitoring server 20 searches change data of the selected application maintained in event store 30 and returns the requested data to health monitor 11. At step 520, health monitor 11 displays the change events on another UI, one example of which is illustrated in FIG. 6B. Upon viewing the change events, the system administrator may implement fixes or roll back the changes that caused the performance degradation by making an input selection on top of one of the change events (step 522). In the sample illustration of FIG. 6B, the code change implemented at 13:40:06 can be rolled back by manipulating cursor 620 to that location and making an input selection on that highlighted line. In response to the input selection, health monitor 11 issues an undo command identifying the change event by its change ID through API 23 (step 524). Central monitoring server 20 passes this undo command to the appropriate monitored machine and, in turn, the monitored machine executes the undo command using its versioning tool.

If the monitored machine is a virtual machine, as an alternative to the pinpoint rolling back, the entire virtual machine may be rolled back to the most recent snapshot that was taken prior to the point in time performance degradation was observed.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for tracking changes to data containers including one or more first data containers corresponding to a first application and one or more second data containers corresponding to a second application, said method comprising:
   identifying one or more of the first data containers to be monitored for configuration changes of the first application based on a first expression that is stored in association with the first application and identifies the one or more of the first data containers;
   identifying one or more of the second data containers to be monitored for configuration changes of the second application based on a second expression that is stored in association with the second application and identifies the one or more of the second data containers;
   detecting one or more changes to a monitored data container; and
   storing data representative of a changed version of the monitored data container responsive to detecting the one or more changes to the monitored data container.

2. The method of claim 1, wherein the first and second data containers include at least one of files and folders, and wherein the first and second expressions specify paths of the at least one of files and folders that are to be monitored.

3. The method of claim 2, wherein the first and second expressions specify environmental variables, the values of which define paths of the at least one of files and folders that are to be monitored.

4. The method of claim 2, wherein detecting the one or more changes to the monitored data container includes detecting multiple file events, and wherein the method further comprises:
   transforming the multiple file events into a single, normalized file event.

5. The method of claim 1, further comprising:
   performing a diff operation on the changed version of the monitored data container against a previous version of the monitored data container and storing results of the diff operation as the data representative of the changed version of the text file.

6. The method of claim 1, wherein the one or more changes to the monitored data container are detected within a predetermined time period.

7. The method of claim 1, wherein the first and second applications are deployed on a virtualization system.

8. The method of claim 1, further comprising:
   collecting and storing performance data associated with the first and second applications.

9. The method of claim 8, wherein the collected and stored performance data include at least one of CPU usage, memory usage, and latency.

10. The method of claim 8, further comprising:
displaying an indication of the stored performance data associated with the first or the second application along with an indication of stored data representative of changed versions of the first or the second application.

11. A non-transitory computer-readable storage medium storing instructions, which when executed by a computer system, perform operations for tracking changes to data containers including one or more first data containers corresponding to a first application and one or more second data containers corresponding to a second application, the operations comprising:
identifying one or more of the first data containers to be monitored for configuration changes of the first application based on a first expression that is stored in association with the first application and identifies the one or more of the first data containers;
identifying one or more of the second data containers to be monitored for configuration changes of the second application based on a second expression that is stored in association with the second application and identifies the one or more of the second data containers;
detecting one or more changes to a monitored data container; and
storing data representative of a changed version of the monitored data container responsive to detecting the one or more changes to the monitored data container.

12. The non-transitory computer-readable storage medium of claim 11, wherein the first and second data containers include at least one of files and folders, and wherein the first and second expressions specify paths of the at least one of files and folders that are to be monitored.

13. The non-transitory computer-readable storage medium of claim 12, wherein the first and second expressions specify environmental variables, the values of which define paths of the at least one of files and folders that are to be monitored.

14. The non-transitory computer-readable storage medium of claim 12, wherein detecting the one or more changes to the monitored data container includes detecting multiple file events, and wherein the operations further comprise:
transforming the multiple file events into a single, normalized file event.

15. The non-transitory computer-readable storage medium of claim 11, the operations further comprising:
performing a diff operation on the changed version of the monitored data container against a previous version of the monitored data container and storing results of the diff operation as the data representative of the changed version of the text file.

16. The non-transitory computer-readable storage medium of claim 11, wherein the one or more changes to the monitored data container are detected within a predetermined time period.

17. The non-transitory computer-readable storage medium of claim 11, wherein the first and second applications are deployed on a virtualization system.

18. The non-transitory computer-readable storage medium of claim 11, the operations further comprising:
collecting and storing performance data associated with the first and second applications.

19. The non-transitory computer-readable storage medium of claim 18, the operations further comprising:
displaying an indication of the stored performance data associated with the first or the second application along with an indication of stored data representative of changed versions of the first or the second application.

20. A system, comprising:
a processor; and
a memory, wherein the memory includes an application program configured to perform operations for tracking changes to data containers including one or more first data containers corresponding to a first application and one or more second data containers corresponding to a second application, the operations comprising:
identifying one or more of the first data containers to be monitored for configuration changes of the first application based on a first expression that is stored in association with the first application and identifies the one or more of the first data containers,
identifying one or more of the second data containers to be monitored for configuration changes of the second application based on a second expression that is stored in association with the second application and identifies the one or more of the second data containers,
detecting one or more changes to a monitored data container, and
storing data representative of a changed version of the monitored data container responsive to detecting the one or more changes to the monitored data container.

* * * * *